United States Patent
Naguvanahalli et al.

(10) Patent No.: US 11,971,765 B2
(45) Date of Patent: Apr. 30, 2024

(54) DYNAMIC NETWORK-WIDE COORDINATED MANAGEMENT OF POWER OVER ETHERNET

(71) Applicant: HEWLETT PACKARD ENTERPRISE DEVELOPMENT LP, Houston, TX (US)

(72) Inventors: Yashavantha Nagaraju Naguvanahalli, Bangalore (IN); Vigneshwara Upadhyaya, Bangalore (IN); Isaac Theogaraj, Bangalore (IN); Naresh Kumar, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 210 days.

(21) Appl. No.: 17/206,307

(22) Filed: Mar. 19, 2021

(65) Prior Publication Data
US 2021/0341985 A1    Nov. 4, 2021

(30) Foreign Application Priority Data

Apr. 30, 2020    (IN) .............................. 202041018607

(51) Int. Cl.
*G06F 1/3234* (2019.01)
*G06F 1/3209* (2019.01)
(Continued)

(52) U.S. Cl.
CPC .......... *G06F 1/3209* (2013.01); *G06F 1/3253* (2013.01); *H04L 12/12* (2013.01); *H04L 12/40039* (2013.01)

(58) Field of Classification Search
CPC .... G06F 1/3209; G06F 1/3253; G06F 1/3206; G06F 1/3287; H04L 12/12;
(Continued)

(56) References Cited

U.S. PATENT DOCUMENTS 8,594,854 B1 * 11/2013 Tareen ................ H02J 13/0005
700/297
2004/0230846 A1 * 11/2004 Mancey .................. H04L 12/10
713/300

(Continued)

FOREIGN PATENT DOCUMENTS

WO    WO-2019240796 A1    12/2019

*Primary Examiner* — Jaweed A Abbaszadeh
*Assistant Examiner* — Brian J Corcoran
(74) *Attorney, Agent, or Firm* — Hewlett Packard Enterprise Patent Department

(57) ABSTRACT

Systems and methods described herein allow a configurable policy for managing Power over Ethernet (PoE) to be implemented by Power Sourcing Equipments (PSEs) across a network. The policy specifies a set of rules for prioritizing power distribution over Ethernet for the computer network. When Powered Devices (PDs) are connected via Ethernet cables to the PSEs, the PDs send identification information about themselves (e.g., device type and location) to the PSEs. The PSEs assign priority levels to the PDs by electronically comparing the identification information to the set of rules. When a present level of available power is insufficient to power all the PDs via PoE, the PSEs use the priority levels to determine which PDs to power down.

20 Claims, 5 Drawing Sheets

(51) Int. Cl.
*H04L 12/12* (2006.01)
*H04L 12/40* (2006.01)

(58) Field of Classification Search
CPC ......... H04L 12/40039; H04L 12/40045; H04L 12/10; Y02D 10/00
See application file for complete search history.

(56) References Cited

U.S. PATENT DOCUMENTS

| | | | |
|---|---|---|---|
| 2005/0262364 A1* | 11/2005 | Diab | H04M 9/08 713/300 |
| 2005/0272402 A1* | 12/2005 | Ferentz | H04L 12/10 713/320 |
| 2006/0005057 A1 | 1/2006 | Nalawadi et al. | |
| 2006/0053324 A1* | 3/2006 | Giat | H04L 12/10 713/300 |
| 2006/0133368 A1 | 6/2006 | Tollliver | |
| 2006/0143583 A1* | 6/2006 | Diab | G06F 1/3209 713/300 |
| 2007/0110360 A1* | 5/2007 | Stanford | H04L 12/10 385/14 |
| 2008/0005600 A1* | 1/2008 | Diab | G06F 1/3209 713/300 |
| 2009/0019202 A1 | 1/2009 | Shetty et al. | |
| 2010/0030392 A1* | 2/2010 | Ferentz | H04L 12/10 713/320 |
| 2010/0083022 A1* | 4/2010 | Diab | H04L 12/40045 713/340 |
| 2011/0126032 A1 | 5/2011 | Khan et al. | |
| 2013/0207454 A1 | 8/2013 | Stellick | |
| 2016/0349821 A1* | 12/2016 | Ramalingam | G06F 1/3234 |
| 2016/0370850 A1 | 12/2016 | Hamdi et al. | |
| 2020/0012326 A1 | 1/2020 | Steele et al. | |
| 2020/0076628 A1* | 3/2020 | Yam | G06F 1/28 |

\* cited by examiner

| Available power over Ethernet | Allocated to High-Priority PDs | Allocated to Low-Priority PDs |
|---|---|---|
| 100 | 90 | 0 |
| 150 | 90 | 60 |
| 200 | 90 | 110 |
| 250 | 90 | 160 |
| 300 | 150 | 150 |
| 350 | 150 | 200 |
| 400 | 150 | 250 |
| 450 | 300 | 150 |
| 500 | 300 | 200 |
| 550 | 300 | 250 |
| 600 | 90 | 510 |
| 650 | 90 | 560 |

FIG. 2

DYNAMIC NETWORK-WIDE COORDINATED MANAGEMENT OF POWER OVER ETHERNET

BACKGROUND

Power over Ethernet (PoE) allows an Ethernet cable to be used for both power transmission and data transmission. Devices such as Voice over Internet Protocol (VoIP) phones, Light-Emitting Diode (LED) lights, Internet Protocol (IP) cameras, wireless access points (APs), and Bluetooth Low-Energy (BLE) beacons can be powered by PoE and can therefore be installed in locations where it would be impractical or expensive to install conventional wires used to provide power.

A number of industry standards exist for PoE devices. For example, the Institute of Electrical and Electronics Engineers (IEEE) has defined at least three industry standards: IEEE 802.3af, which allows up to 15.4 Watts to be delivered over Category 5 (Cat5) Ethernet cables; IEEE 802.3at, which allows up to 30 Watts to be delivered over Cat5 cables; and IEEE 802.3bt, which allows up to 71.3 Watts to be delivered over Cat5 cables. LTPoE++, a proprietary standard, allows up to 90 Watts to be delivered over Cat5 cables. In the IEEE standards, a device that receives PoE is called a Powered Device (PD), while a device that provides PoE is called a Power Sourcing Equipment (PSE).

BRIEF DESCRIPTION OF THE DRAWINGS

Various features and advantages will become apparent from the following description, given by way of example only, which is made with reference to the accompanying drawings, of which:

FIG. 2 is an example table that illustrates one example of how available power may be allocated between loads from PDs of two different priority levels in a portion of a network, according to one example.

DETAILED DESCRIPTION

Figure 1:
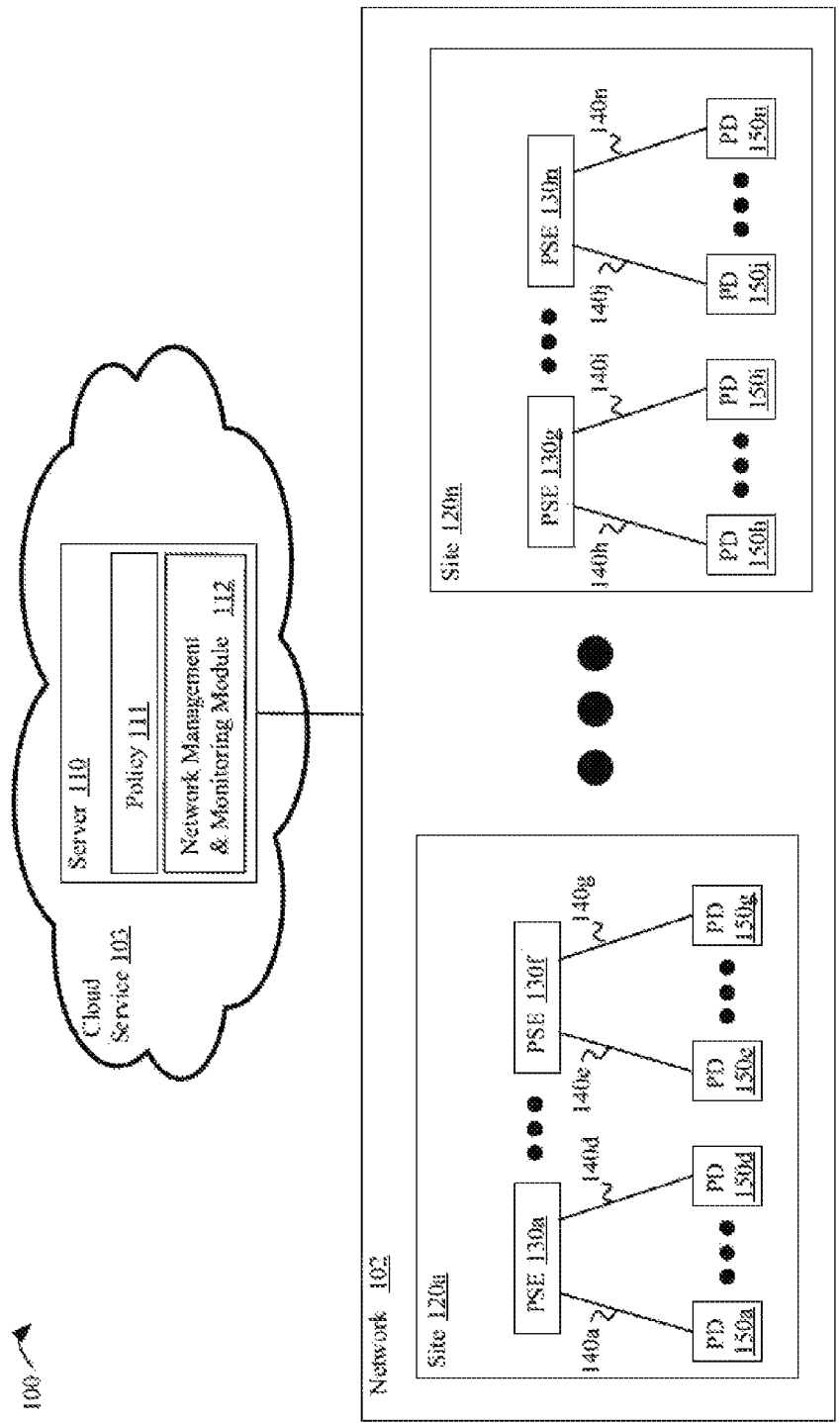
FIG. 1 illustrates a computing environment in which systems described herein can operate, according to one example.

In industrial network deployments, such as enterprise networks and data center networks (DCNs), hundreds or thousands of devices may be connected to a network. While a single PD device may consume a relatively small amount of power delivered via Ethernet, the PD devices in the network may collectively consume an amount of power that is significant in terms of cost and in terms of the percentage of overall power used by devices in the network.

In times of power shortage, such as brownouts or blackouts, it may be desirable to prioritize certain PDs over other so that PDs that serve more important purposes will remain powered on while PDs that serve less important purposes are powered down to ration the power that is available (e.g., from a backup generator). In existing systems, Ethernet switches may have a group of ports that are designated as high priority and a group of ports that are designated as low priority. The groups may be color-coded so that a technician is apprised of which ports have higher priority and can connect each PD to a port having the priority level that the technician deems appropriate at the time that the Ethernet cable that connects the PD to the switch is plugged into the switch. Some enterprise network deployments include multi-slot chassis switches that have designated priorities for each slot.

However, in existing systems, such prioritization for PoE management is localized to each switch. There is no mechanism whereby switches and other PSEs that are distributed across different locations can coordinate with each other. Each switch may have relative priorities defined for the ports and slots located on that switch, but the switch does not have any point of reference to determine whether any ports on other switches in the network should receive higher (or lower) priority than the switch's own ports. In other words, priorities are defined at a localized level rather than on a network-wide (e.g., enterprise) level. Furthermore, in existing systems, a switch can detect local power shortages and react accordingly, but cannot detect or react to power shortages or other exigencies in other parts of the network.

Due to the switch-localized priority scheme, there is no way to change the priority scheme dynamically if corporate directives, changes in state laws, changes in industry standards, emergencies, or other events make it prudent to change the priority scheme. If network administrators wish for such a change, a technician may be obliged to visit each switch in the network, manually unplug the Ethernet cables that connect PDs of interest to the switch, and manually plug those Ethernet cables into different ports on the switch to effect the desired change in the prioritization scheme. Thus, a great deal of time and manual labor may be spent implementing the change. Furthermore, if the technician makes an error by plugging an Ethernet cable into a port with the wrong priority level, there is no automated way to correct the error. It may take a long time for the error to be detected and corrected manually.

By contrast, systems and methods described herein allow a dynamically configurable prioritization scheme to be implemented across a network (e.g., an enterprise network or a data center network). The systems and methods herein facilitate coordination of such a prioritization scheme across multiple PSEs, locations, and sites within a network such that each switch in the network can prioritize PoE power distribution based on information about the network as a whole (as opposed to merely localized information). Furthermore, systems described herein can assign priority levels directly to PDs (e.g., based on device type, location, etc.) and change those priority levels dynamically without requiring any Ethernet cables to be unplugged and plugged into different ports. A policy that includes rules governing how priority levels are assigned to PDs can be created, maintained, accessed, and updated at a single network destination (e.g., a server or cloud service). That policy can include rules that take information about conditions found across the entire network into account. When the policy and rules therein are updated, the policy be pushed to the PSEs in the network such that the updated policy is implemented in the network immediately.

FIG. 1 illustrates a computing environment 100 in which systems described herein can operate, according to one example. As shown, the computing environment 100 may include a computer network 102 (e.g., an enterprise network or a data center network (DON)). A server 110 may be included in a cloud computing service 103 as shown. In other examples, however, the server 110 may reside inside the network 102. Persons of skill in the art will also understand that functionality ascribed to the server 110 may actually be performed by multiple servers and other computing devices employed by the cloud service 103 (e.g., network storage devices) without departing from the spirit and scope of this disclosure.

The network 102 may extend across multiple sites 120a-120n as shown. Some of the sites 120a-120n may be geographically remote relative to each other (e.g., miles or hundreds of miles apart). Some of the sites 120a-120n may also be geographically close to each other (e.g., several hundred feet apart or adjoining each other). However, regardless of how far the sites 120a-120n are distributed, computing devices can connect to the network 102 via hardware located at the sites 120a-120n. While the sites 120a-n are provided for illustrative purposes, persons of skill in the art will understand that no limitation on the number of sites is intended thereby.

As shown, Power Sourcing Equipments (PSEs) 130a-n are situated at the sites 120a-120n. The PSEs 130a-n can be configured to provide Power over Ethernet (PoE) to the Powered Devices (PDs) 150a-n via the Ethernet cables 140a-n. While the PSEs 130a-n, the PDs 150a-n, and the Ethernet cables 140a-n are provided for illustrative purposes, persons of skill in the art will understand that no limitation on the number of PSEs, PDs, or Ethernet cables is intended thereby. Furthermore, the number of PDs connected to a single PSE, the number of PSEs connected to a single PD, and the number of Ethernet cables used to connect a PSE to a PD may all vary. For example, a single PD may be connected to a single PSE or multiple PSEs via more than one Ethernet cable (e.g., to receive more power via Ethernet than can be provided through a single port). Also, in some examples, PSEs and PDs may not necessarily be mutually exclusive. A PoE pass-through switch, for example, may concurrently act as both a PD (by receiving power through one Ethernet port) and a PSE (by providing power to another PD through another Ethernet port).

The server 110 stores a policy 111 (e.g., in local memory or storage) and executes a network management & monitoring module 112 of software that may perform the actions attributed to the server 110 herein and provide an interface through which an administrator may configure the policy 111. The policy 111 specifies a set of rules for prioritizing power distribution over Ethernet for the network 102, The policy 111 can be configured (e.g., by an administrator) to ensure that power is distributed over Ethernet in the network 102 in a manner that satisfies the directives specified by a consumer entity associated with the network 102, In one example, the policy 111 is part of a profile for the consumer entity. There are many different types of directives that may be satisfied, so several illustrative examples are provided below for reference. However, as explained in the examples described below, the policy 111 can specify rules for assigning priority levels to the PDs 150a-n based on the device types, locations, wattage ratings, and other characteristics of the PDs 150a-n. The PDs 150a-n may be configured to report their device types, wattage ratings, locations, and other characteristics upon connecting to the network 102 (e.g., during an authentication process). The granularity with which location can be reported may vary. For example, a PD that is located near three or more BLE beacons may be able to report a very precise location (e.g., within a thirty-foot radius) after receiving data from the BLE beacons. In another example, the location of a PD may be less granular (e.g., a specific floor of a building, a specific building, or a site).

The server 110 can push the policy 111 to the PSEs 130a-n to ensure that the PSEs 130a-n enforce the policy 111 across the network 102 when providing PoE to the PDs 150a-n. The server 110 can also apprise the PSEs 130a-n of present levels of available power for portions of the network 102. A portion of the network may be as small as a single PSE and the PDs connected thereto or as large as one or more sites. The policy 111 may specify the level of available power to represent a power cap specified by an administrator in accordance with the consumer entities desires (e.g., to reduce overall power consumption so that costs will be reduced). A PSE may also detect when the level of available power is lower than prescribed by the policy due to unforeseen events (e.g., brownouts or blackouts) and report the decreased power level to the server 110 so that the server 110 can apprise other the PSEs in the network 102. When an administrator updates the policy 111, the server 110 push the updated version of the policy 111 to the PSEs 130a-n for immediate implementation.

To illustrate how the elements shown in FIG. 1 may work together, the following illustrative examples are provided.

In a first example, suppose the consumer entity is a hospital, that site 102a is a first building that includes an emergency room on a first floor and an operating room on a second floor. Also suppose that site 102n is a second building that includes a consultation room on a first floor, a conference room and several offices on a second floor, and a prosthetics lab on a third floor.

In this first example, an administrator for the hospital might configure the policy 111 to specify that PDs that are wall docks have low priority at both site 102a and site 102n. Another rule may specify that PDs that are intercom speakers have high priority at site 102a (e.g., so that doctors can be paged in urgent circumstances), but have only low priority at site 102n. Another rule may specify that PDs that are wireless APs have high priority on the second floor at site 102n (e.g., to ensure conference room equipment works properly), but low priority elsewhere. Another rule may specify that any PD located on the third floor at site 102n has low priority before 8 AM and after 6 PM (e.g., during hours when the prosthetics lab is closed).

In this example, also suppose that an unforeseen pandemic strikes the population served by the hospital at sites 102a and 102n. Also suppose that the hospital temporarily repurposes the first floor at site 102n into an intensive care unit in response to a surge in the number of patients admitted to the hospital. An administrator can log on to the server 110 and update the policy 111 to specify that intercom speakers should now be assigned high priority on the first floor at site 102n. Furthermore, the administrator can revise the policy 111 so that some or all rules that apply to PDs at site 102n match the rules that apply to PDs at site 102a. The server 110 pushes the updated version of the policy 111 to the PSEs 130a-n. The PSEs 130a-n begin to enforce the policy 111 immediately. No Ethernet cords have to be unplugged or plugged into different ports to effect this change. Once the pandemic passes, the administrator can update the policy again to restore the rules that were in place before the pandemic. Again, manual labor is unnecessary to effect the update.

In a second example, suppose the consumer entity is a state government, that site 102a is an administrative building, and that site 102n is a prison. An administrator can specify a number of rules for governing how PoE is prioritized in the policy 111. For example, one rule can specify that PDs that are door access control components (e.g., keyless entry systems that read badges) have critical priority at site 102n, but only high priority at site 102a. Another rule can specify that PDs that are surveillance cameras positioned in a cafeteria at site 102n have critical priority during scheduled mealtimes for inmates, but have only high priority during hours that do not overlap with those mealtimes, Another rule may specify that PDs that are wireless APs have low priority at site 102n, but have high priority at site 102a.

In this example, suppose a new law that applies to prisons is passed and that the new law dictates that emergency lights be installed in prison hallways to light a path to an emergency exit. An administrator may decide that PDs that are LED lights can serve this purpose and adds a rule to the policy 111 stating that such LED lights at the sight 102n should be assigned critical priority. The server 110 pushes the updated policy 111 to the PSEs 130a-n. A technician who installs the LED lights can plug Ethernet cables that connect the LED lights to PSEs into any available port on any PSE without unplugging any of the Ethernet cables PSEs 130a-n that were previously plugged in for other PDs. The PSEs 130a-n will detect the device type and location of the LED lights when the LED lights are connected to the PSEs 130a-n and apply the policy 111 as updated.

The two examples above highlight several advantages that systems of the present disclosure provide (e.g., as in the computing environment 100). One advantage is that rules in the policy 111 can be tailored to suit the preferences of many different types of consumer entities based on device types, locations, times of day, and other parameters. Another advantage is that the policy 111 can be updated and enforced very quickly without requiring a technician to rearrange the Ethernet cables PSEs 130a-n that are already plugged into the PSEs 130a-n. The capacity to implement quick updates may be very desirable during unforeseen events and when changes are needed to ensure that the network 102 manages PoE in a manner that complies with new laws.

FIG. 2 is a table 200 that illustrates one example of how available power may be allocated between loads from PDs of two different priority levels in a portion of a network, according to one example. The portion of the network may be a single PSE, a group of PSEs located at one or more sites, a multi-slot chassis containing multiple switches, or some other combination of PSEs situated at one or more locations.

As shown by the labels in the header row 202, entries in column 210 show levels of available power over Ethernet in ascending order from top to bottom. Entries in column 212 show the amount of power allocated to high-priority PDs at each level of available power. Similarly, entries in column 214 show the amount of power allocated to low-priority PDs at each level of available power. The units for the entries in columns 210, 212, 214 are Watts.

As shown in the table 200, when only 100 Watts are available, 90 Watts may be allocated to the high-priority PDs and 0 Watts may be allocated to the low-priority PDs. As the amount of available power increases, the amount of power allocated to the high-priority PDs may remain at 90 Watts when up to 250 Watts of power are available, then increase as to as much as 300 Watts when 450 Watts of power are available. When 600 Watts of power are available, the amount of power allocated to the high-priority PDs may decrease back to 90 Watts.

By contrast, when only 100 Watts are available, zero Watts may be allocated to the low-priority PDs. The amount of power allocated to the low-priority PDs may increase to 250 Watts when 400 Watts are available, decrease to 150 watts when 450 Watts are available, and then increase up to 560 Watts when 650 Watts are available.

The table 200 is provides one illustrative example of how a policy in a consumer entity's profile might dictate that PoE be allocated in a portion of a network when different levels of power are available. There are, however, countless other ways in which the allocation of available power may be defined in a policy. One advantage of the systems described herein is that such a policy can be configured to conform to each consumer entity's unique preferences.

Figure 3:
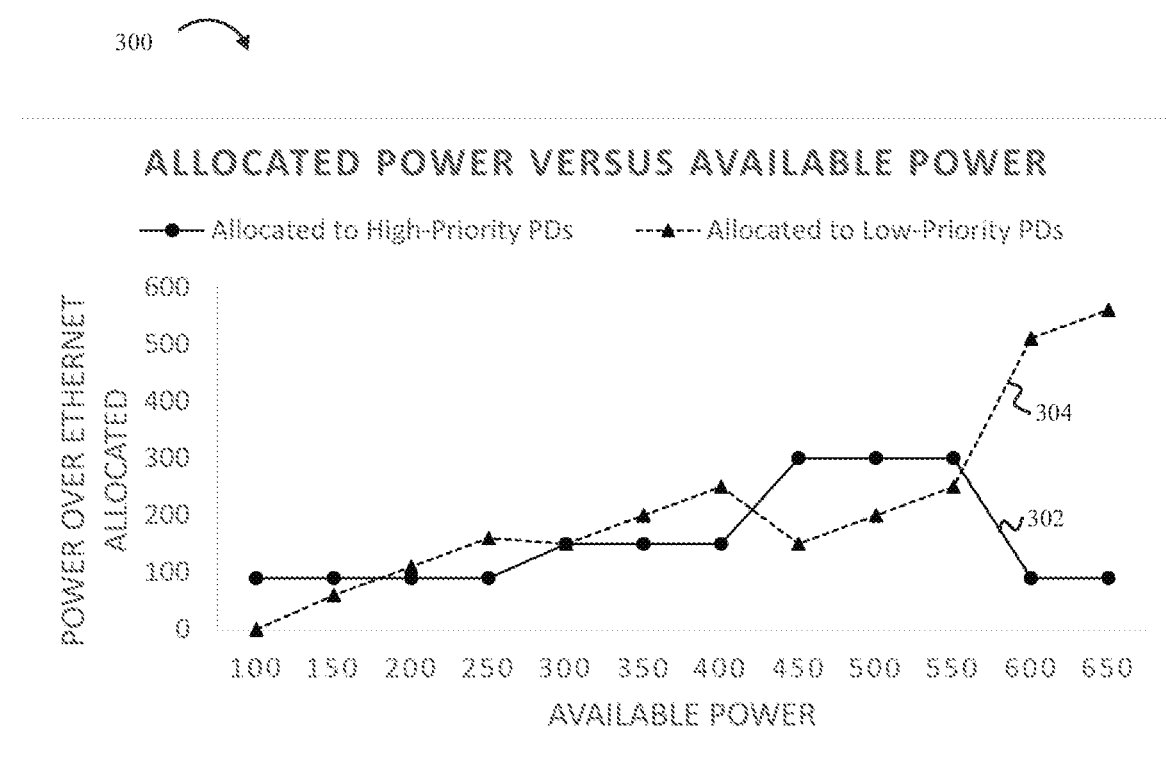
FIG. 3 is a graph that illustrates the entries shown in the example table of FIG. 2 in graphical form, according to one example.

FIG. 3 is a graph 300 that illustrates the entries shown in table 200 in graphical form, according to one example. The curve 302 shows the amount of power allocated to high-priority PDs at each level of available power. Similarly, the curve 304 shows the amount of power allocated to low-priority PDs at each level of available power.

As shown in the graph 300, the pattern of power allocation to PDs of different priority levels can vary for each priority level as the available power increases. A consumer entity can create a custom pattern of power allocation as part of a policy defined in a profile for the customer entity.

Figure 4:
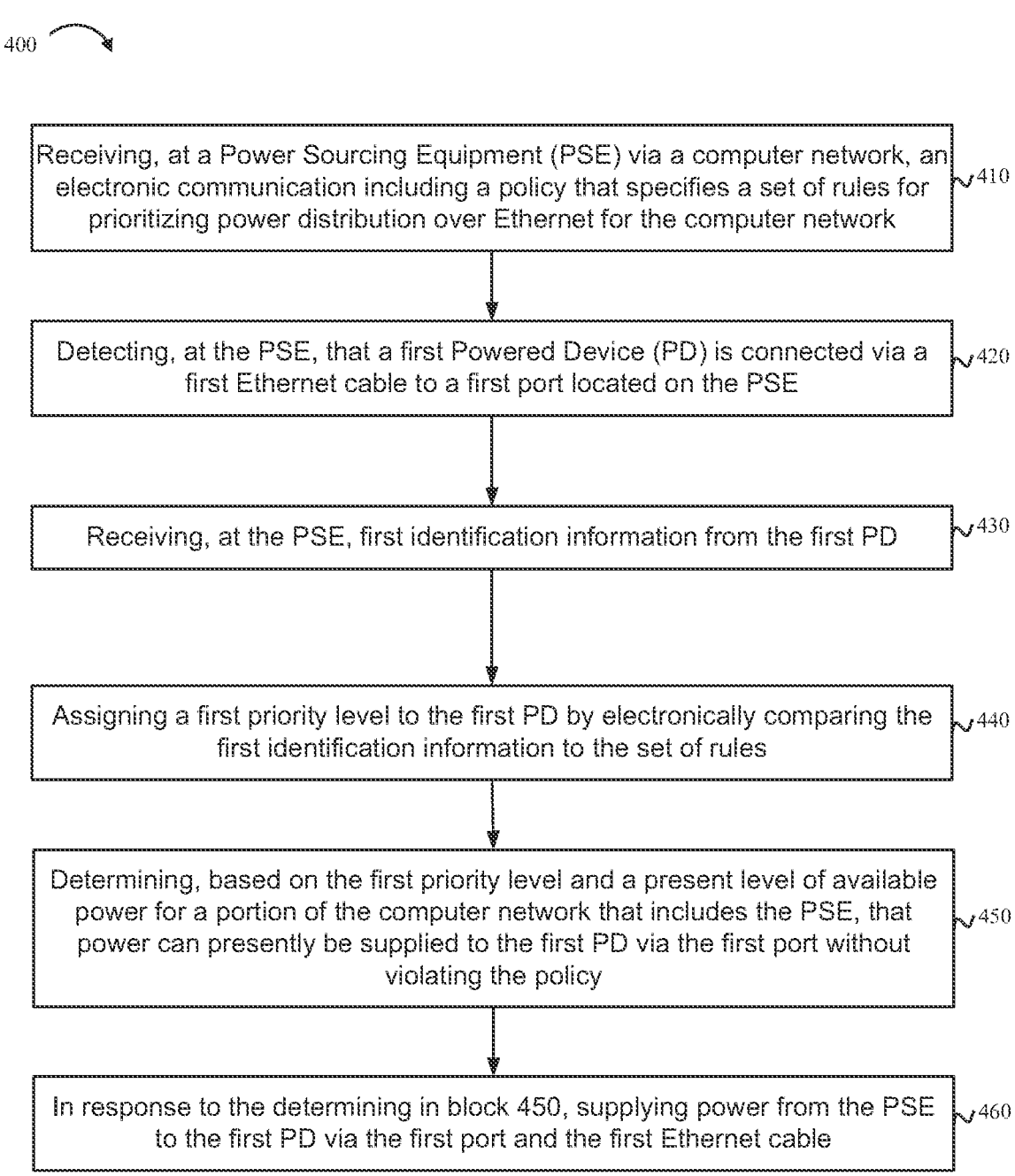
FIG. 4 illustrates functionality for a PSE as described herein, according to one example.

FIG. 4 illustrates functionality 400 for a PSE as described herein, according to one example. The functionality 400 may be implemented as a method or can be executed as instructions on a machine (e.g., by one or more processors), where the instructions are included on at least one computer-readable storage medium (e.g., a transitory or non-transitory computer-readable storage medium). While only six blocks are shown in the functionality 400, the functionality 400 may include other actions described herein. Also, some of the blocks shown in the functionality 400 may be omitted without departing from the spirit and scope of this disclosure.

As shown in block 410, the functionality 500 includes receiving, at a Power Sourcing Equipment (PSE) via a computer network, an electronic communication including a policy that specifies a set of rules for prioritizing power distribution over Ethernet for the computer network.

As shown in block 420, the functionality 500 includes detecting, at the PSE, that a first Powered Device (PD) is connected via a first Ethernet cable to a first port located on the PSE.

As shown in block 430, the functionality 500 includes receiving, at the PSE, first identification information from the first PD.

As shown in block 440, the functionality 500 includes assigning a first priority level to the first PD by electronically comparing the first identification information to the set of rules.

As shown in block 450, the functionality 500 includes determining, based on the first priority level and a present level of available power for a portion of the computer network that includes the PSE, that power can presently be supplied to the first PD via the first port without violating the policy.

As shown in block 460, the functionality 500 includes, in response to the determining in block 450, supplying power from the PSE to the first PD via the first port and the first Ethernet cable.

The functionality 400 may also include receiving, at the PSE via the computer network, an additional electronic communication including an updated set of rules for the policy; assigning an updated priority level to the first PD by electronically comparing the first identification information to the updated set of rules; determining, based on the updated priority level and the present level of available power for the portion of the computer network that includes the PSE, that power can no longer be supplied to the first PD via the first port without violating the policy due to the updated set of rules; and in response to determining that power can no longer be supplied to the first PD via the first port without violating the policy, ceasing to supply power from the PSE to the first PD via the first port and the first Ethernet cable.

The functionality 400 may also include detecting, at the PSE, a decrease in the present level of available power for the portion of the computer network that includes the PSE; determining, based on the first priority level and the decrease in the present level of available power, that power can no longer be supplied to the first PD via the first port without violating the policy; and in response to determining that power can no longer be supplied to the first PD without violating the policy, ceasing to supply power from the PSE to the first PD via the first port and the first Ethernet cable.

The functionality 400 may also include detecting, at the PSE, that a second PD has been connected via a second Ethernet cable to a second port located on the PSE; receiving, at the PSE, second identification information from the second PD; assigning a second priority level to the second PD by electronically comparing the second identification information to the set of rules, wherein the second priority level is higher than the first priority level; determining, based on the first priority level assigned to the first PD, the second priority level to the second PD, and the present level of available power, that power cannot be concurrently supplied to both the first PD via the first port and the second PD via the second port without violating the policy; and in response to determining that power cannot be concurrently supplied to both the first PD via the first port and the second PD via the second port without violating the policy; ceasing to supply power from the PSE to the first PD via the first port and the first Ethernet cable, and supplying power from the PSE to the second PD via the second port and the second Ethernet cable.

In some examples, the first identification information comprises a device type of the first PD and a present location of the first PD, and assigning the first priority level to the first PD comprises: identifying, in the set of rules, a rule specifying that devices of the device type that are positioned at the present location of the first PD are to be assigned the first priority level; and assigning the first priority level to the first PD based on a comparison of the location and the device type to the rule.

Also, in some examples, the first identification information comprises a present location of the first PD and a device type of the first PD, and assigning the first priority level to the first PD comprises: determining a present time of day; identifying, in the set of rules, a first rule specifying that the present location of the first PD is associated with the present level of available power at the present time of day; identifying, in the set of rules, a second rule specifying that devices of the device type that are positioned at the present location of the first PD are to be assigned the first priority level at the present time of day; and assigning the first priority level to the first PD based on a comparison of the location, the device type, and the time of day to the first rule and the second rule.

In some examples, determining that power can presently be supplied to the first PD without violating the policy comprises: calculating a sum of wattage ratings for a plurality of additional PDs connected to the computer network; calculating a difference by subtracting the sum from the present level of available power; and determining that a wattage rating of the first PD does not exceed the difference.

The functionality 400 may also include detecting, at the PSE, that the first Ethernet cable has been unplugged from the first port and plugged into a second port on the PSE; detecting, at the PSE, that a second Ethernet cable has been plugged into the first port and that the second Ethernet cable connects the PSE to a second PD; receiving, at the PSE, second identification information from the second PD; assigning a second priority level to the second PD by electronically comparing the second identification information to the set of rules; determining that the present level of available power for the portion of the network that includes the PSE is insufficient to power both the first PD and the second PD concurrently; and upon determining that the second priority level assigned to the second PD is lower than the first priority level assigned to the first PD: supplying power from the PSE to the first PD via the second port and the first Ethernet cable; and refraining from supplying power from the PSE to the second PD via the first port and the second Ethernet cable.

Figure 5:
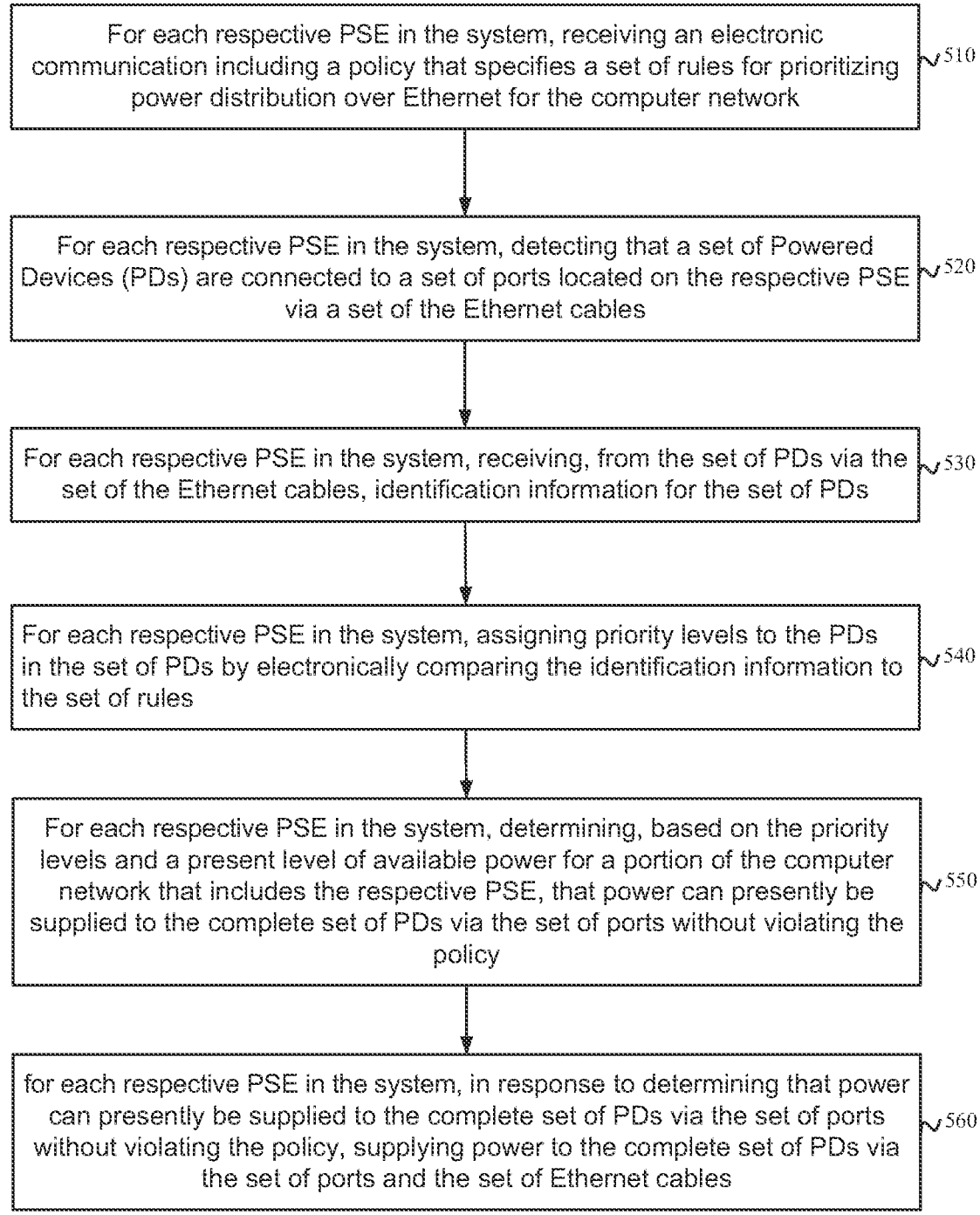
FIG. 5 illustrates functionality for a system that comprises a plurality of PSEs as described herein, according to one example.

FIG. 5 illustrates functionality 500 for a system that comprises a plurality of PSEs as described herein, according to one example. The functionality 500 may be implemented as a method or can be executed as instructions on a machine (e.g., by one or more processors), where the instructions are included on at least one computer-readable storage medium (e.g., a transitory or non-transitory computer-readable storage medium). While only six blocks are shown in the functionality 500, the functionality 500 may include other actions described herein. Also, some of the blocks shown in the functionality 500 may be omitted without departing from the spirit and scope of this disclosure.

As shown in block 510, the functionality 500 includes, for each respective PSE in the system, receiving an electronic communication including a policy that specifies a set of rules for prioritizing power distribution over Ethernet for the computer network.

As shown in block 520, the functionality 500 includes, for each respective PSE in the system, detecting that a set of Powered Devices (PDs) are connected to a set of ports located on the respective PSE via a set of the Ethernet cables.

As shown in block 530, the functionality 500 includes, for each respective PSE in the system, receiving, from the set of PDs via the set of the Ethernet cables, identification information for the set of PDs.

As shown in block 540, the functionality 500 includes, for each respective PSE in the system, assigning priority levels to the PDs in the set of PDs by electronically comparing the identification information to the set of rules.

As shown in block 550, the functionality 500 includes, for each respective PSE in the system, determining, based on the priority levels and a present level of available power for a portion of the computer network that includes the respective PSE, that power can presently be supplied to the complete set of PDs via the set of ports without violating the policy.

As shown in block 560, the functionality 500 includes, for each respective PSE in the system, in response to determining that power can presently be supplied to the complete set of PDs via the set of ports without violating the policy, supplying power to the complete set of PDs via the set of ports and the set of Ethernet cables.

The functionality 500 may also include calculating a sum of wattage ratings for the PDs in the set of PDs. Furthermore, the system may also comprise a server that performs the following set of additional actions: receiving, from each respective PSE in the portion of the computer network, the sum of wattage ratings for the PDs in the set of PDs that are connected to the set of ports located on the respective PSE; calculating an overall sum of the sums received from the respective PSEs in the portion of the computer network; calculating an updated present level of available power for the portion of the computer network by subtracting the overall sum from an overall amount of power allocated to the portion of the computer network; and sending the updated present level of available power to each respective PSE in the portion of the computer network.

In some examples, the portion of the computer network is a geographical site, and wherein the overall amount of power allocated to the portion of the computer network is specified in the policy.

The functionality 500 may also include determining, based on the priority levels and the updated present level of available power for a portion of the computer network that includes the respective PSE, that power can no longer presently be supplied to the complete set of PDs via the set of ports without violating the policy; selecting; from the set of PDs, a preferred subset of the PDs that have been assigned a higher priority level than a remainder subset of the PDs; and in response to the selecting: supplying power from the respective PSE to the preferred subset of the PDs via a first subset of the Ethernet cables that connect the preferred subset of the PDs to a first subset of the ports, and refraining from supplying power from the respective PSE to the remainder subset of PDs via a second subset of the Ethernet cables that connect the remainder subset of the PDs to a remainder subset of the ports.

In some examples, selecting the preferred group of PDs comprises: calculating an additional sum of wattage ratings for the PDs in the preferred subset; determining that the additional sum does not exceed the updated present level of available power for the portion of the computer network that includes the respective PSE; determining a difference by subtracting the sum from the updated present level of available power; and determining that no PD in the remainder subset has a wattage rating that is less than or equal to the difference.

In some examples, the identification information comprises device types for the PDs in the set of PDs, and assigning the priority levels to the PDs in the set of PDs comprises; identifying, in the set of rules, rules that map the device types to the priority levels; and assigning the priority level to each PD in the set of PDs based on a comparison of the location and the device type to the rule.

While the present techniques may be susceptible to various modifications and alternative forms, the embodiments discussed above have been provided only as examples. It is to be understood that the techniques are not intended to be limited to the particular examples disclosed herein. Indeed, the present techniques include all alternatives, modifications, and equivalents falling within the true spirit and scope of the appended claims.

We claim:

1. A method comprising:
  receiving, at a Power Sourcing Equipment (PSE) via a computer network, an electronic communication including a policy that specifies a set of rules for determining priority levels for Powered Devices (PDs) connected to the PSE, wherein the electronic communication does not specify individual priority levels for the PDs and the PSE uses the set of rules to assign the priority levels to the PDs and each of the rules is applicable to a class of PDs defined by the rule and is not specific to an individual PD, the priority levels being classifications assigned to the PDs by the PSE and used by the PSE in prioritizing power distribution over Ethernet for the computer network;
  detecting, at the PSE, that a first PD is connected via a first Ethernet cable to a first port located on the PSE;
  receiving, at the PSE, first identification information from the first PD;
  assigning, at the PSE, a first priority level to the first PD by electronically comparing the first identification information to the set of rules;
  determining, based on the first priority level and a present level of available power for a portion of the computer network that includes the PSE, that power can presently be supplied to the first PD via the first port without violating the policy; and
  in response to the determining, supplying power from the PSE to the first PD via the first port and the first Ethernet cable.

2. The method of claim 1, further comprising:
  receiving, at the PSE via the computer network, an additional electronic communication including an updated set of rules for determining priority levels for the PDs, the updated set of rules replacing the set of rules such that the PSE uses the updated set of rules to assign the priority levels to the PDs;
  assigning, at the PSE, an updated priority level to the first PD by electronically comparing the first identification information to the updated set of rules;
  determining, based on the updated priority level and the present level of available power for the portion of the computer network that includes the PSE, that power can no longer be supplied to the first PD via the first port without violating the policy due to the updated set of rules; and
  in response to determining that power can no longer be supplied to the first PD via the first port without violating the policy, ceasing to supply power from the PSE to the first PD via the first port and the first Ethernet cable.

3. The method of claim 1, further comprising:
  detecting, at the PSE, a decrease in the present level of available power for the portion of the computer network that includes the PSE;
  determining, based on the first priority level and the decrease in the present level of available power, that power can no longer be supplied to the first PD via the first port without violating the policy; and
  in response to determining that power can no longer be supplied to the first PD without violating the policy, ceasing to supply power from the PSE to the first PD via the first port and the first Ethernet cable.

4. The method of claim 1, further comprising:
  detecting, at the PSE, that a second PD has been connected via a second Ethernet cable to a second port located on the PSE;
  receiving, at the PSE, second identification information from the second PD;
  assigning, at the PSE, a second priority level to the second PD by electronically comparing the second identification information to the set of rules, wherein the second priority level is higher than the first priority level;
  determining, based on the first priority level assigned to the first PD, the second priority level assigned to the second PD, and the present level of available power, that power cannot be concurrently supplied to both the first PD via the first port and the second PD via the second port without violating the policy; and in response to determining that power cannot be concurrently supplied to both the first PD via the first port and the second PD via the second port without violating the policy:

ceasing to supply power from the PSE to the first PD via the first port and the first Ethernet cable, and supplying power from the PSE to the second PD via the second port and the second Ethernet cable.

5. The method of claim 1, wherein the first identification information comprises a device type of the first PD and a present location of the first PD, and wherein assigning the first priority level to the first PD comprises:

identifying, in the set of rules, a rule specifying that devices of the device type that are positioned at the present location of the first PD are to be assigned the first priority level; and assigning the first priority level to the first PD based on a comparison of the location and the device type to the rule.

6. The method of claim 1, wherein the first identification information comprises a present location of the first PD and a device type of the first PD, and wherein assigning the first priority level to the first PD comprises:

determining a present time of day;

identifying, in the set of rules, a first rule specifying that the present location of the first PD is associated with the present level of available power at the present time of day;

identifying, in the set of rules, a second rule specifying that devices of the first device type that are positioned at the present location of the first PD are to be assigned the first priority level at the present time of day; and assigning the first priority level to the first PD based on a comparison of the location, the device type, and the time of day to the first rule and the second rule.

7. The method of claim 1, wherein determining that power can presently be supplied to the first PD without violating the policy comprises:

calculating a sum of wattage ratings for a plurality of additional PDs connected to the computer network;

calculating a difference by subtracting the sum from the present level of available power; and determining that a wattage rating of the first PD does not exceed the difference.

8. The method of claim 1, further comprising:

detecting, at the PSE, that the first Ethernet cable has been unplugged from the first port and plugged into a second port on the PSE;

detecting, at the PSE, that a second Ethernet cable has been plugged into the first port and that the second Ethernet cable connects the PSE to a second PD;

receiving, at the PSE, second identification information from the second PD;

assigning, at the PSE, a second priority level to the second PD by electronically comparing the second identification information to the set of rules;

determining that the present level of available power for the portion of the network that includes the PSE is insufficient to power both the first PD and the second PD concurrently; and upon determining that the second priority level assigned to the second PD is lower than the first priority level assigned to the first PD:

supplying power from the PSE to the first PD via the second port and the first Ethernet cable; and refraining from supplying power from the PSE to the second PD via the first port and the second Ethernet cable.

9. A system comprising a plurality of Power Sourcing Equipments (PSEs) in a computer network, wherein each respective PSE comprises a processor and memory with instructions thereon which, when executed by the processor, cause the respective PSE to perform a set of actions comprising:

receiving an electronic communication including a policy that specifies a set of rules for determining priority levels for Powered Devices (PDs) connected to the respective PSE, wherein the electronic communication does not specify individual priority levels for the PDs and the PSE uses the set of rules to assign the priority levels to the PDs and each of the rules is applicable to a class of PDs defined by the rule and is not specific to an individual PD, the priority levels being classifications assigned to the PDs by the respective PSE and used by the respective PSE in prioritizing power distribution over Ethernet for the computer network;

detecting that a set of PDs are connected to a set of ports located on the respective PSE via a set of the Ethernet cables;

receiving, from the set of PDs via the set of the Ethernet cables, identification information for the set of PDs;

assigning, at the respective PSE, priority levels to the PDs in the set of PDs by electronically comparing the identification information to the set of rules;

determining, based on the priority levels and a present level of available power for a portion of the computer network that includes the respective PSE, that power can presently be supplied to the complete set of PDs via the set of ports without violating the policy; and in response to determining that power can presently be supplied to the complete set of PDs via the set of ports without violating the policy, supplying power to the complete set of PDs via the set of ports and the set of Ethernet cables.

10. The system of claim 9, wherein the set of actions further comprises calculating a sum of wattage ratings for the PDs in the set of PDs, and wherein the system further comprises a server with a memory and instructions thereon that, when executed by a processor at the server, perform the following set of additional actions:

receiving, from each respective PSE in the portion of the computer network, the sum of wattage ratings for the PDs in the set of PDs that are connected to the set of ports located on the respective PSE;

calculating an overall sum of the sums received from the respective PSEs in the portion of the computer network;

calculating an updated present level of available power for the portion of the computer network by subtracting the overall sum from an overall amount of power allocated to the portion of the computer network; and sending the updated present level of available power to each respective PSE in the portion of the computer network.

11. The system of claim 10, wherein the set of actions further comprises:

determining, based on the priority levels and the updated present level of available power for a portion of the computer network that includes the respective PSE, that power can no longer presently be supplied to the complete set of PDs via the set of ports without violating the policy;

selecting, from the set of PDs, a preferred subset of the PDs that have been assigned a higher priority level than a remainder subset of the PDs; and in response to the selecting:

supplying power from the respective PSE to the preferred subset of the PDs via a first subset of the Ethernet cables that connect the preferred subset of the PDs to a first subset of the ports, and refraining from supplying power from the respective PSE to the remainder subset of PDs via a second subset of the Ethernet cables that connect the remainder subset of the PDs to a remainder subset of the ports.

12. The system of 11, wherein selecting the preferred group of PDs comprises:

calculating an additional sum of wattage ratings for the PDs in the preferred subset;

determining that the additional sum does not exceed the updated present level of available power for the portion of the computer network that includes the respective PSE;

determining a difference by subtracting the sum from the updated present level of available power; and determining that no PD in the remainder subset has a wattage rating that is less than or equal to the difference.

13. The system of claim 10, wherein the portion of the computer network is a geographical site, and wherein the overall amount of power allocated to the portion of the computer network is specified in the policy.

14. The system of claim 9, wherein the identification information comprises device types and locations for the PDs in the set of PDs, and wherein assigning the priority levels to the PDs in the set of PDs comprises:

identifying, in the set of rules, rules that map the device types to the priority levels; and assigning the priority level to each PD in the set of PDs based on a comparison of the location and the device type of each PD to the rule.

15. A non-transitory computer-readable storage medium comprising instructions thereon which, when executed by one or more processors, perform the following set of actions:

receiving, at a Power Sourcing Equipment (PSE) via a computer network, an electronic communication including a policy that specifies a set of rules for determining priority levels for Powered Devices (PDs) connected to the PSE, wherein the electronic communication does not specify individual priority levels for the PDs and the PSE uses the set of rules to assign the priority levels to the PDs and each of the rules is applicable to a class of PDs defined by the rule and is not specific to an individual PD, the priority levels being classifications assigned to the PDs by the PSE and used by the PSE in prioritizing power distribution over Ethernet for the computer network;

detecting, at the PSE, that a first PD is connected via a first Ethernet cable to a first port located on the PSE;

receiving, at the PSE, first identification information from the first PD;

assigning, at the PSE, a first priority level to the first PD by electronically comparing the first identification information to the set of rules;

determining, based on the first priority level and a present level of available power for a portion of the computer network that includes the PSE, that power can presently be supplied to the first PD via the first port without violating the policy; and in response to the determining, supplying power from the PSE to the first PD via the first port and the first Ethernet cable.

16. The non-transitory computer-readable storage medium of claim 15, wherein the set of actions further comprises:

receiving, at the PSE via the computer network, an additional electronic communication including an updated set of rules for determining priority levels for the PDs, the updated set of rules replacing the set of rules such that the PSE uses the updated set of rules to assign the priority levels to the PDs;

assigning, at the PSE, an updated priority level to the first PD by electronically comparing the first identification information to the updated set of rules;

determining, based on the updated priority level and the present level of available power for the portion of the computer network that includes the PSE, that power can no longer be supplied to the first PD via the first port without violating the policy due to the updated set of rules; and in response to determining that power can no longer be supplied to the first PD via the first port without violating the policy, ceasing to supply power from the PSE to the first PD via the first port and the first Ethernet cable.

17. The non-transitory computer-readable storage medium of claim 15, wherein the set of actions further comprises:

detecting, at the PSE, a decrease in the present level of available power for the portion of the computer network that includes the PSE;

determining, based on the first priority level and the decrease in the present level of available power, that power can no longer be supplied to the first PD via the first port without violating the policy; and in response to determining that power can no longer be supplied to the first PD without violating the policy, ceasing to supply power from the PSE to the first PD via the first port and the first Ethernet cable.

18. The non-transitory computer-readable medium of claim 15, wherein the first identification information comprises a device type of the first PD and a present location of the first PD, and wherein assigning the first priority level to the first PD comprises:

identifying, in the set of rules, a rule specifying that devices of the device type that are positioned at the present location of the first PD are to be assigned the first priority level; and assigning the first priority level to the first PD based on a comparison of the location and the device type to the rule.

19. The non-transitory computer-readable of claim 15, wherein the first identification information comprises a present location of the first PD and a device type of the first PD, and wherein assigning the first priority level to the first PD comprises:

determining a present time of day;

identifying, in the set of rules, a first rule specifying that the present location of the first PD is associated with the present level of available power at the present time of day;

identifying, in the set of rules, a second rule specifying that devices of the device type that are positioned at the present location of the first PD are to be assigned the first priority level at the present time of day; and assigning the first priority level to the first PD based on a comparison of the location, the device type, and the time of day to the first rule and the second rule.

20. The non-transitory computer-readable storage medium of claim 15, wherein the set of actions further comprises:
   detecting, at the PSE, that the first Ethernet cable has been unplugged from the first port and plugged into a second port on the PSE;
   detecting, at the PSE, that a second Ethernet cable has been plugged into the first port and that the second Ethernet cable connects the PSE to a second PD;
   receiving, at the PSE, second identification information from the second PD;
   assigning a second priority level to the second PD by electronically comparing the second identification information to the set of rules;
   determining that the present level of available power for the portion of the network that includes the PSE is insufficient to power both the first PD and the second PD concurrently; and
   upon determining that the second priority level assigned to the second PD is lower than the first priority level assigned to the first PD:
      supplying power from the PSE to the first PD via the second port and the first Ethernet cable; and
      refraining from supplying power from the PSE to the second PD via the first port and the second Ethernet cable.

* * * * *